(12) United States Patent
Yamashita

(10) Patent No.: US 11,307,101 B2
(45) Date of Patent: Apr. 19, 2022

(54) TEMPERATURE INPUT UNIT, TEMPERATURE MEASURING DEVICE, AND RECORDING MEDIUM

(71) Applicant: Mitsubishi Electric Corporation, Tokyo (JP)

(72) Inventor: Kohei Yamashita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/417,791

(22) PCT Filed: Jun. 17, 2019

(86) PCT No.: PCT/JP2019/023970
§ 371 (c)(1),
(2) Date: Jun. 24, 2021

(87) PCT Pub. No.: WO2020/255222
PCT Pub. Date: Dec. 24, 2020

(65) Prior Publication Data
US 2022/0042855 A1  Feb. 10, 2022

(51) Int. Cl.
*G01K 7/00* (2006.01)
*G01K 15/00* (2006.01)
(Continued)

(52) U.S. Cl.
CPC ............... *G01K 7/10* (2013.01); *G01K 7/021* (2013.01); *G01K 7/026* (2013.01); *G01K 7/20* (2013.01)

(58) Field of Classification Search
None
See application file for complete search history.

(56) References Cited

U.S. PATENT DOCUMENTS 2,096,047 A   10/1937  Leeds
4,609,292 A   9/1986   Asano et al.
(Continued)

FOREIGN PATENT DOCUMENTS

CN   106885588 A   * 6/2017  ........... G01D 3/0365
CN   206573227 U   * 10/2017
(Continued)

OTHER PUBLICATIONS

International Search Report and Written Opinion dated Sep. 17, 2019, received for PCT Application PCT/JP2019/023970, Filed on Jun. 17, 2019, 8 pages including English Translation.
(Continued)

*Primary Examiner* — Mirellys Jagan
(74) *Attorney, Agent, or Firm* — Xsensus LLP

(57) ABSTRACT

A temperature input unit includes a disconnection detection circuit that measures a temperature of a measurement target with at least one of a thermocouple or a temperature measurement resistor and feeds a disconnection detection current for disconnection detection to the thermocouple and a compensating wire connected to the thermocouple. A controller controls, before measuring the temperature of the measurement target with the thermocouple, a terminal switch and an input circuit switch to connect the compensating wire to a temperature measurement resistor input circuit and an A/D converter, and calculates a predicted value of a voltage drop resulting from resistance of the compensating wire occurring in response to the disconnection detection current. The controller controls the terminal switch and the input circuit switch to connect the compensating wire to a thermocouple input circuit and the A/D converter, and subtracts the predicted value from a measured value of the thermoelectromotive force detected by the
(Continued)

thermocouple input circuit to calculate a corrected measured value of the thermoelectromotive force.

12 Claims, 5 Drawing Sheets

(51) Int. Cl.
  *G01K 7/10* (2006.01)
  *G01K 7/20* (2006.01)
  *G01K 7/026* (2021.01)
  *G01K 7/02* (2021.01)

(56) References Cited

U.S. PATENT DOCUMENTS

| | | |
|---|---|---|
| 6,293,700 B1 | 9/2001 | Lund et al. |
| 2015/0276498 A1 | 10/2015 | Van Minnen et al. |
| 2016/0327438 A1 | 11/2016 | Fukui et al. |

FOREIGN PATENT DOCUMENTS

| | | | |
|---|---|---|---|
| CN | 111397772 B | * | 6/2021 |
| JP | 63-273026 A | | 11/1988 |
| JP | 1-291131 A | | 11/1989 |
| JP | 3-269227 A | | 11/1991 |
| JP | 6-207861 A | | 7/1994 |
| JP | 2000-88672 A | | 3/2000 |
| JP | 2005-83989 A | | 3/2005 |
| TW | 495606 B | | 7/2002 |
| TW | I276779 B | | 3/2007 |
| TW | I540313 B | | 7/2016 |

OTHER PUBLICATIONS

Decision to Grant dated Apr. 21, 2020, received for JP Application 2020-506375, 5 pages including English Translation.

* cited by examiner

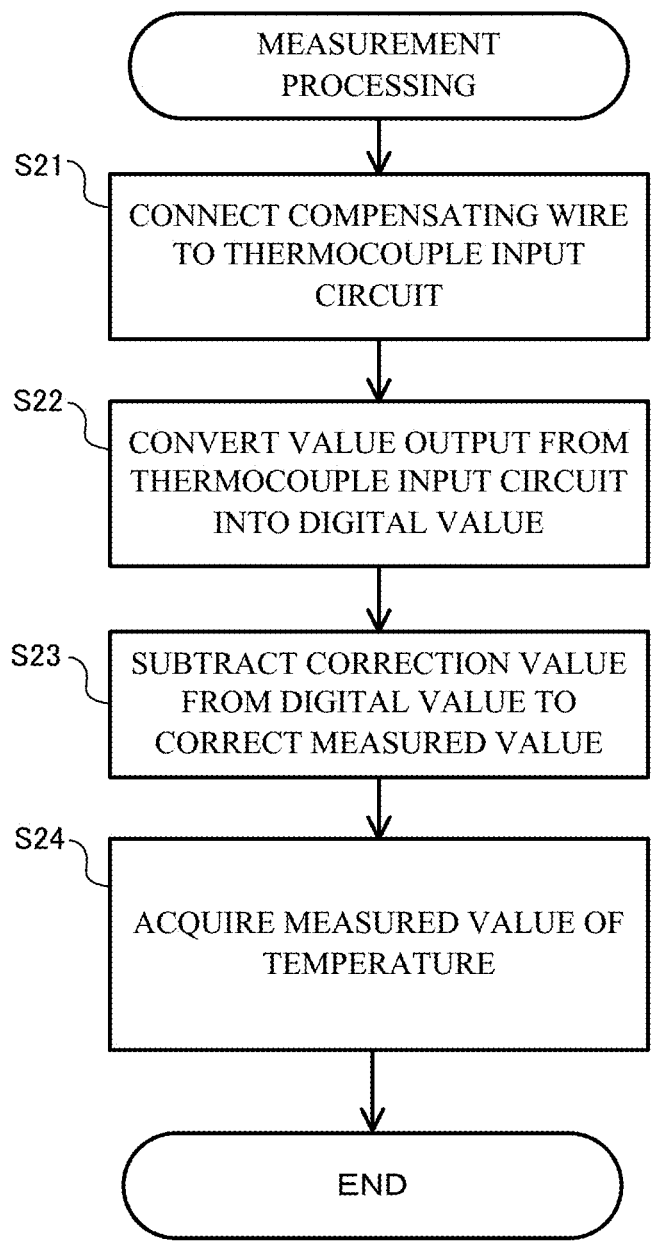

TEMPERATURE INPUT UNIT, TEMPERATURE MEASURING DEVICE, AND RECORDING MEDIUM

CROSS-REFERENCE TO RELATED APPLICATION

The present application is based on PCT filing PCT/JP2019/023970, filed Jun. 17, 2019, the entire contents of which are incorporated herein by reference.

TECHNICAL FIELD

The present disclosure relates to a temperature input unit, a temperature measuring device, and a recording medium.

BACKGROUND ART

A temperature sensor including a thermocouple measures temperature based on a thermoelectromotive force generated in the thermocouple that changes in accordance with temperature changes. A temperature sensor including a thermocouple feeds a direct current to the thermocouple and a compensating wire, measures a potential difference between the two ends of the thermocouple and the compensating wire as a thermoelectromotive force, and detects a temperature based on the measured voltage. The compensating wire is a conductive wire connecting the thermocouple and the measuring device.

To detect disconnection between the thermocouple and the compensating wire, the temperature sensor including a thermocouple may include disconnection detection means for feeding a weak direct current to the thermocouple and the compensating wire to detect disconnection between the thermocouple and the compensating wire based on a change in the fed current. The temperature sensor including the disconnection detection means is known to cause an error in the measured value of a thermoelectromotive force. This is because feeding a weak direct current to the thermocouple and the compensating wire causes a voltage drop resulting from the resistance in the compensating wire, and an error caused by the voltage drop is included in the measured value of the thermoelectromotive force.

Thus, after a user raises the temperature of a measurement target and measures the temperature of the measurement target with the thermocouple, the user measures the resistance value of the compensating wire and corrects the measured value of the thermoelectromotive force by a voltage error calculated from the resistance value. After correcting the thermoelectromotive force, the user measures the temperature of the measurement target again.

Patent Literature 1 describes disconnection detection by feeding an alternating current to the thermocouple and the compensating wire instead of a direct current, and based on a change in a component of the alternating current. The structure described in Patent Literature 1 measures the thermoelectromotive force based on a change in a direct current component, and detects disconnection based on a change in an alternating current component. This structure does not cause an error in the measured value of the thermoelectromotive force.

CITATION LIST

Patent Literature

Patent Literature 1: Unexamined Japanese Patent Application Publication No. 2005-83989

SUMMARY OF INVENTION

Technical Problem

With a known method for premeasuring the resistance value of a compensating wire and correcting the measured value of the thermoelectromotive force by a voltage error calculated from the resistance value, a user is to raise the temperature of a measurement target before the temperature measurement of the measurement target, measure the temperature of the measurement target with a thermocouple, and then measure the resistance of the compensating wire. With this method, the user is to perform complicated preparations.

For disconnection detection, alternating-current signal generating means that is not usually used for a temperature sensor including a thermocouple is to be added to the structure described in Patent Literature 1, and thus has a complex circuit structure. This structure is costly.

In response to the above issue, an objective of the present disclosure is to provide a simple structure that corrects temperature measurement errors resulting from the resistance of a compensating wire without complicated preparations performed by the user.

Solution to Problem

To achieve the above objective, a temperature input unit according to an aspect of the present disclosure includes disconnection detection means for measuring a temperature of a measurement target with at least one of a thermocouple or a temperature measurement resistor, and feeding a disconnection detection current for disconnection detection to the thermocouple and a compensating wire connected to the thermocouple in a case of measurement of the temperature with the thermocouple, a thermocouple detection circuit to detect a thermoelectromotive force of the compensating wire and the thermocouple connected to the temperature input unit in the case of measurement of the temperature with the thermocouple, a temperature measurement resistor detection circuit to feed a constant current to the temperature measurement resistor connected to the temperature input unit, and to detect a resistance of the temperature measurement resistor in a case of measurement of the temperature with the temperature measurement resistor, a connection switch to connect the compensating wire to the thermocouple detection circuit or the temperature measurement resistor detection circuit, and a measurer to calculate the temperature of the measurement target based on the thermoelectromotive force detected by the thermocouple detection circuit in the case of measurement of the temperature with the thermocouple, and to calculate the temperature of the measurement target based on the resistance of the temperature measurement resistor detected by the temperature measurement resistor detection circuit in the case of measurement of the temperature with the temperature measurement resistor. The measurer controls, before measuring the temperature of the measurement target with the thermocouple, the connection switch to connect the compensating wire to the temperature measurement resistor detection circuit, and calculates a predicted value of a voltage drop resulting from a resistance of the compensating wire occurring in response to the disconnection detection current, and controls the connection switch to connect the compensating wire to the thermocouple detection circuit, and subtracts the predicted value from a measured value of the thermoelectromotive force detected by the thermocouple detection circuit to calculate a corrected measured value of the thermoelectromotive force.

Advantageous Effects of Invention

The temperature input unit according to the above aspect of the present disclosure connects the compensating wire to the temperature measurement resistor detection circuit by controlling the connection switch before measuring the temperature of the measurement target with the thermocouple, and calculates a predicted value of a voltage drop resulting from resistance of the compensating wire occurring in response to the disconnection detection current, and controls the connection switch to connect the compensating wire to the thermocouple detection circuit, and subtracts the predicted value from a measured value of the thermoelectromotive force detected by the thermocouple detection circuit to calculate a corrected measured value of the thermoelectromotive force. Accordingly, since the temperature input unit has such a structure, there is no need to raise the temperature of a measurement target to measure the temperature with a thermocouple for measurement of the resistance value of a compensating wire before the temperature measurement of the measurement target. The temperature input unit can thus correct measurement errors caused by a voltage drop resulting from the resistance of the compensating wire without complicated preparations performed by a user. The temperature input unit calculates a correction value with a temperature measurement resistor input circuit prepared for temperature measurement, and does not need a significant structure change. Thus, the temperature input unit with a simple structure can correct measurement errors caused by a voltage drop resulting from the resistance of the compensating wire.

BRIEF DESCRIPTION OF DRAWINGS

FIG. 5 is a flowchart of measurement processing performed by the temperature input unit according to the embodiment.

DESCRIPTION OF EMBODIMENTS

Embodiments

Figure 1:
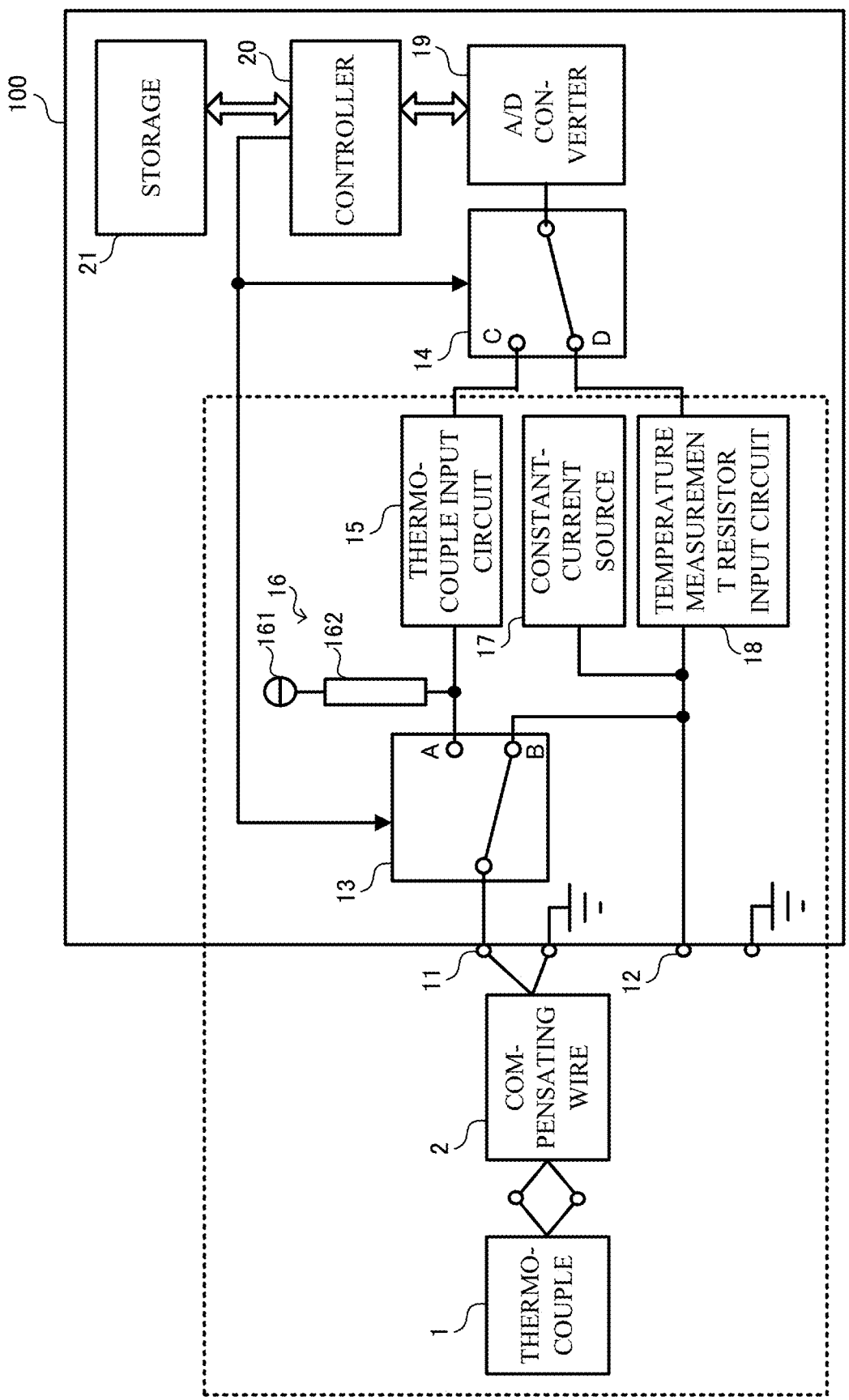
FIG. 1 is a block diagram of a temperature input unit according to an embodiment of the present disclosure.

A temperature input unit 100 shown in FIG. 1 is a functional unit included in a programmable logic controller (PLC) that operates in, for example, a production system or a control system. The temperature input unit 100 has a function of measuring the temperature of a measurement target with a thermocouple and a function of measuring the temperature of a measurement target with a temperature measurement resistor. The temperature input unit 100 outputs a measured temperature to a central processing unit (CPU) that controls the entire PLC. The thermocouple is a sensor including a circuit acquired by connecting two dissimilar metal conductors, and measures temperatures using a property of generating a thermoelectromotive force with a difference in temperature between one junction and another junction in the circuit. The thermocouple is connected to the temperature input unit 100 with a compensating wire. The compensating wire is a conductive wire connecting the thermocouple to the temperature input unit 100. The temperature measurement resistor is a sensor that measures temperature using a property of the electric resistance of the metal or a metal oxide changing in accordance with a temperature change.

The temperature input unit 100 according to an embodiment calculates a correction value for correcting an error of a measured value before the temperature is measured with the thermocouple. After measuring the temperature of a measurement target with the thermocouple, the temperature input unit 100 corrects the measured value with the correction value prepared in advance. The temperature input unit 100 is an example of a temperature input unit according to an aspect of the present disclosure.

The error occurs in a measured value for the reasons described below. The temperature input unit 100 includes means for feeding a direct current for disconnection detection to the thermocouple and the compensating wire to detect disconnection between the thermocouple and the compensating wire. Feeding a direct current for disconnection detection to the thermocouple and the compensating wire causes a voltage drop resulting from the resistance of the thermocouple and the compensating wire. This voltage drop causes an error in the measured value of the thermoelectromotive force. Typically, the resistance value of elemental wires in the thermocouple is about several ohms per meter. The elemental wires in the thermocouple are often short. Thus, the thermocouple is assumed to have a small resistance. Assuming that the voltage drop resulting from the resistance of a thermocouple negligibly affects an error in a measured value, the structure according to this embodiment corrects an error due to a voltage drop resulting from the resistance of the compensating wire.

As shown in FIG. 1, the temperature input unit 100 includes a thermocouple input terminal 11 to which a thermocouple 1 and a compensating wire 2 are connected, a temperature measurement resistor input terminal 12 to which a temperature measurement resistor is connected, a terminal switch 13 that switches a counterpart to which the thermocouple input terminal 11 is connected, an input circuit switch 14 that switches an input from a sensor, a thermocouple input circuit 15 that detects a thermoelectromotive force from the thermocouple 1, a disconnection detection circuit 16 that detects disconnection between the thermocouple 1 and the compensating wire 2, a constant-current source 17 that feeds a current to the temperature measurement resistor, a temperature measurement resistor input circuit 18 that detects a change in the resistance of the temperature measurement resistor, an analog/digital (A/D) converter 19 that converts values output from the thermocouple input circuit 15 and the temperature measurement resistor input circuit 18 to digital values, a controller 20 that controls each component of the temperature input unit 100, and a storage 21 that stores correction values.

Examples of the thermocouple 1 include a type K thermocouple, a type S thermocouple, and a type R thermocouple. The compensating wire 2 is a conductive wire of a metal with a thermoelectromotive force characteristic substantially equivalent to that of the thermocouple 1, and connecting the thermocouple 1 to the temperature input unit 100.

The thermocouple input terminal 11 is connected to which the compensating wire 2. The thermocouple input terminal 11 is connected to the thermocouple input circuit 15 with the terminal switch 13 in between. In the illustrated example, the thermocouple input terminal 11 has one end to which the compensating wire 2 is connected, and the other end grounded. In temperature measurement using the thermocouple 1, a user connects the thermocouple 1 and the compensating wire 2 to the thermocouple input terminal 11.

The temperature measurement resistor input terminal 12 is connected to a temperature measurement resistor (not shown). In the illustrated example, the temperature measurement resistor input terminal 12 has one end to which the temperature measurement resistor is connected, and the other end grounded. In temperature measurement using the temperature measurement resistor, a user connects the temperature measurement resistor to the temperature measurement resistor input terminal 12.

The terminal switch 13 includes, for example, a semiconductor switch, and is controlled by the controller 20 to connect the thermocouple input terminal 11 to either the thermocouple input circuit 15 or the temperature measurement resistor input circuit 18. In temperature measurement using the thermocouple 1, the user connects one end of the compensating wire 2 to which the thermocouple 1 is connected to the thermocouple input terminal 11. Switching on the terminal switch 13 to a position A electrically connects the compensating wire 2 and the thermocouple input circuit 15. Switching on the terminal switch 13 to a position B electrically connects the compensating wire 2 and the temperature measurement resistor input circuit 18.

The input circuit switch 14 includes, for example, a semiconductor switch, and is controlled by the controller 20 to connect the thermocouple input circuit 15 or the temperature measurement resistor input circuit 18 to the A/D converter 19. Switching on the input circuit switch 14 to a position C electrically connects the thermocouple input circuit 15 and the A/D converter 19. Switching on the input circuit switch 14 to a position D electrically connects the temperature measurement resistor input circuit 18 and the A/D converter 19. The terminal switch 13 and the input circuit switch 14 are examples of connection switches according to an aspect of the present disclosure.

The thermocouple input circuit 15 is connected to the thermocouple input terminal 11 with the terminal switch 13 in between, and connected to the A/D converter 19 with the input circuit switch 14 in between. The thermocouple input circuit 15 includes an amplifier to amplify an input voltage signal and output the amplified signal. The thermocouple 1 and the compensating wire 2 are connected to the thermocouple input terminal 11. When the terminal switch 13 is switched on to the position A and the input circuit switch 14 is switched on to the position C, the thermocouple input circuit 15 amplifies a thermoelectromotive force input from the thermocouple 1 and the compensating wire 2 and outputs the amplified voltage signal to the A/D converter 19. In the illustrated example, the thermocouple input terminal 11 has one end grounded. Thus, the thermocouple input circuit 15 outputs a voltage signal acquired by amplifying a difference in potential between the ground and the thermocouple 1 and the compensating wire 2. Together with the A/D converter 19 and the controller 20 (described later), the thermocouple input circuit 15 functions as a thermocouple detection circuit that detects a thermoelectromotive force from the thermocouple 1 and the compensating wire 2.

The disconnection detection circuit 16 is means for detecting disconnection between the thermocouple 1 and the compensating wire 2, and is connected to the compensating wire 2 with the terminal switch 13 in between. Switching on the terminal switch 13 to the position A electrically connects the compensating wire 2 and the disconnection detection circuit 16. The disconnection detection circuit 16 includes a power supply 161 and a disconnection detection resistor 162. The power supply 161 feeds a direct current to the thermocouple 1 and the compensating wire 2. The disconnection detection resistor 162 restricts a current flowing from the power supply 161 to the thermocouple 1 and the compensating wire 2. Thus, the disconnection detection resistor 162 can weaken a current flowing to the thermocouple 1 and the compensating wire 2. The current fed by the disconnection detection circuit 16 to the thermocouple 1 and the compensating wire 2 is referred to as a disconnection detection current.

The constant-current source 17 feeds a constant current to the temperature measurement resistor. In the illustrated example, the constant current is fed to the temperature measurement resistor to calculate the resistance value of the temperature measurement resistor based on the potential difference between the two ends of the temperature measurement resistor.

The temperature measurement resistor input circuit 18 is connected to the temperature measurement resistor input terminal 12, and connected to the A/D converter 19 with the input circuit switch 14 in between. The temperature measurement resistor input circuit 18 includes an amplifier to amplify an input voltage signal and output the amplified signal. The temperature measurement resistor is connected to the temperature measurement resistor input terminal 12. When the input circuit switch 14 is switched on to the position D, the temperature measurement resistor input circuit 18 amplifies a voltage signal input from the temperature measurement resistor and outputs the amplified voltage signal to the A/D converter 19. In the illustrated example, the temperature measurement resistor input terminal 12 has one end grounded. Thus, the temperature measurement resistor input circuit 18 outputs a signal acquired by amplifying the difference in potential between the ground and the temperature measurement resistor. Together with the A/D converter 19 and the controller 20 (described later), the constant-current source 17 and the temperature measurement resistor input circuit 18 function as a temperature measurement resistor detection circuit that detects the resistance of the temperature measurement resistor.

As described above, the temperature input unit 100 calculates a correction value for correcting an error in a measured value before temperature measurement using the thermocouple 1. Thus, when the terminal switch 13 is switched on to the position B and the input circuit switch 14 is switched on to the position D, the temperature measurement resistor input circuit 18 amplifies a voltage signal input from the thermocouple input terminal 11 and outputs the amplified signal to the A/D converter 19.

The A/D converter 19 converts an analog value indicated by the input voltage signal into a digital value and outputs the resulting value to the controller 20. When the input circuit switch 14 is switched on to the position C, the A/D converter 19 converts an analog value indicated by the voltage signal output by the thermocouple input circuit 15 into a digital value and outputs the resulting value to the controller 20. When the input circuit switch 14 is switched on to the position D, the A/D converter 19 converts an analog value indicated by the voltage signal output by the temperature measurement resistor input circuit 18 into a digital value and outputs the resulting value to the controller 20.

The controller 20 includes a CPU. The controller 20 executes programs stored in the storage 21 to implement the functions of the temperature input unit 100.

In the embodiment, for temperature measurement using the thermocouple 1, the controller 20 controls the terminal switch 13 and the input circuit switch 14 to electrically connect the compensating wire 2, the thermocouple input circuit 15, and the A/D converter 19. The thermocouple input circuit 15 amplifies a voltage signal input from the thermocouple input terminal 11 and outputs the amplified voltage signal to the A/D converter 19. The A/D converter 19 converts an analog value indicating the voltage signal provided from the thermocouple input circuit 15 into a digital value and outputs the resulting value to the controller 20. Thus, upon receiving the digital value from the A/D converter 19, the controller 20 corrects the provided digital value. The controller 20 refers to a standard thermoelectromotive force table stored in the storage 21 and acquires the measured value of the temperature corresponding to the corrected digital value. The controller 20 provides data indicating the acquired temperature to, for example, the CPU.

In the embodiment, the controller 20 calculates a correction value for correcting an error in a measured value before temperature measurement using the thermocouple 1 and subtracts the correction value from the digital value provided from the A/D converter 19 to calculate a corrected digital value. More specifically, before temperature measurement, the controller 20 controls the terminal switch 13 and the input circuit switch 14 to electrically connect the thermocouple input terminal 11, the temperature measurement resistor input circuit 18, and the A/D converter 19. At this time, the temperature measurement resistor input circuit 18 amplifies a voltage signal input from the thermocouple input terminal 11 and outputs the amplified voltage signal to the A/D converter 19. The A/D converter 19 converts an analog value indicating the voltage signal provided from the temperature measurement resistor input circuit 18 into a digital value and outputs the resulting value to the controller 20. Thus, the controller 20 calculates a correction value based on the digital value provided from the A/D converter 19, and stores the calculated correction value in the storage 21. The method for calculating a correction value will be described later.

To perform temperature measurement using a temperature measurement resistor, the controller 20 controls the input circuit switch 14 to electrically connect the temperature measurement resistor input terminal 12, the temperature measurement resistor input circuit 18, and the A/D converter 19. At this time, the temperature measurement resistor input circuit 18 amplifies a voltage signal input from the temperature measurement resistor input terminal 12 and outputs the amplified voltage signal to the A/D converter 19. The A/D converter 19 converts an analog value indicating the voltage signal provided from the temperature measurement resistor input circuit 18 into a digital value and outputs the resulting value to the controller 20. Upon receiving the digital value from the A/D converter 19, the controller 20 calculates the resistance value of the temperature measurement resistor based on the provided digital value and the current value of current provided from the constant-current source 17. The controller 20 refers to a resistance value table stored in the storage 21 to acquire a measured value of the temperature corresponding to the calculated resistance value. The controller 20 provides data indicating the acquired temperature to, for example, the CPU. The controller 20 is an example of a measurer according to an aspect of the present disclosure.

The storage 21 includes a volatile memory and a non-volatile memory to store programs for implementing various functions of the temperature input unit 100 and data for executing the programs. The storage 21 also stores the standard thermoelectromotive force table for temperature measurement using the thermocouple 1, and the resistance value table of the temperature measurement resistor for temperature measurement using a temperature measurement resistor. The standard thermoelectromotive force table and the resistance value table are in accordance with, for example, Japanese Industrial Standards (JIS). The storage 21 stores correction values calculated in advance with the method described later.

Figure 2:
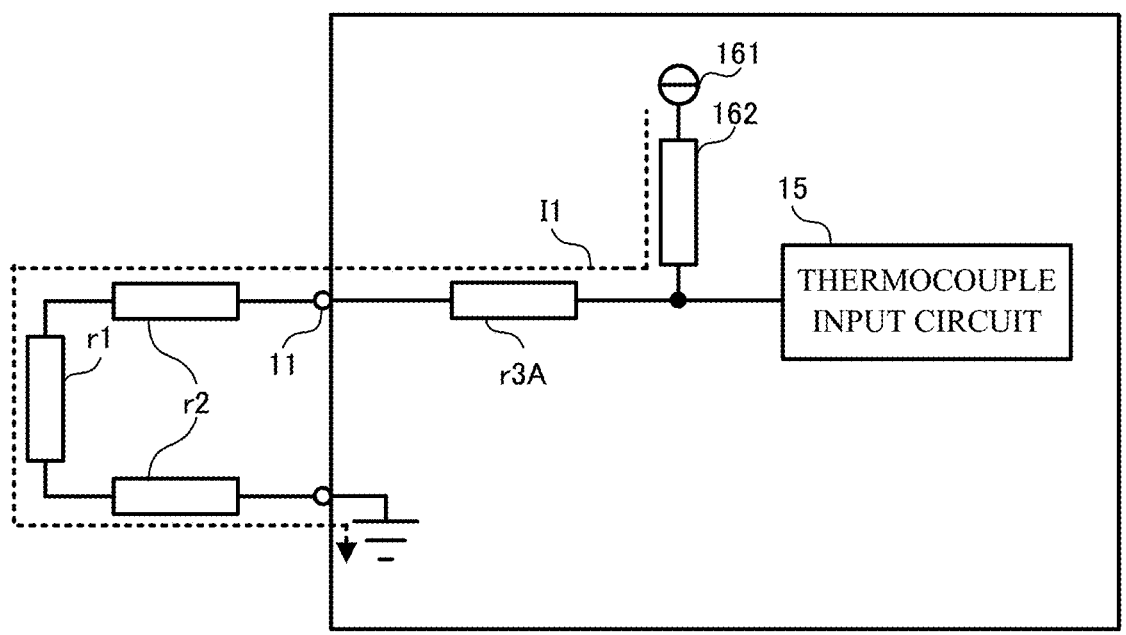
FIG. 2 is a circuit diagram of a thermocouple input circuit to which a compensating wire is connected in the embodiment, showing an equivalent circuit.

A correction method will now be described. First, in temperature measurement using the thermocouple 1, a weak direct current fed from the disconnection detection circuit 16 flows through the terminal switch 13, the compensating wire 2, the thermocouple 1, and the compensating wire 2 in this order. FIG. 2 shows an equivalent circuit enclosed with a broken line in FIG. 1 in which the terminal switch 13 is switched on to the position A. The resistance value of the thermocouple 1 is denoted with r1, the resistance value of the compensating wire 2 with r2, the on-resistance value of the terminal switch 13 switched on to the position A with r3A, and the current value of the direct current fed from the power supply 161 with I1. At this time, a voltage V1 input into the thermocouple input circuit 15 is expressed using the formula (1) below.

$$V1=(r1+2\times r2+r3A)\times I1 \qquad (1)$$

As described above, the resistance of the thermocouple 1 is often smaller than the resistance of the compensating wire 2, and a voltage drop resulting from the resistance of the thermocouple 1 often negligibly affects an error in a measured value. Thus, the resistance of the thermocouple 1 is neglected. In this case, the voltage V1 input into the thermocouple input circuit 15 is expressed using the formula (2) below.

$$V1=(2\times r2+r3A)\times I1 \qquad (2)$$

Figure 3:
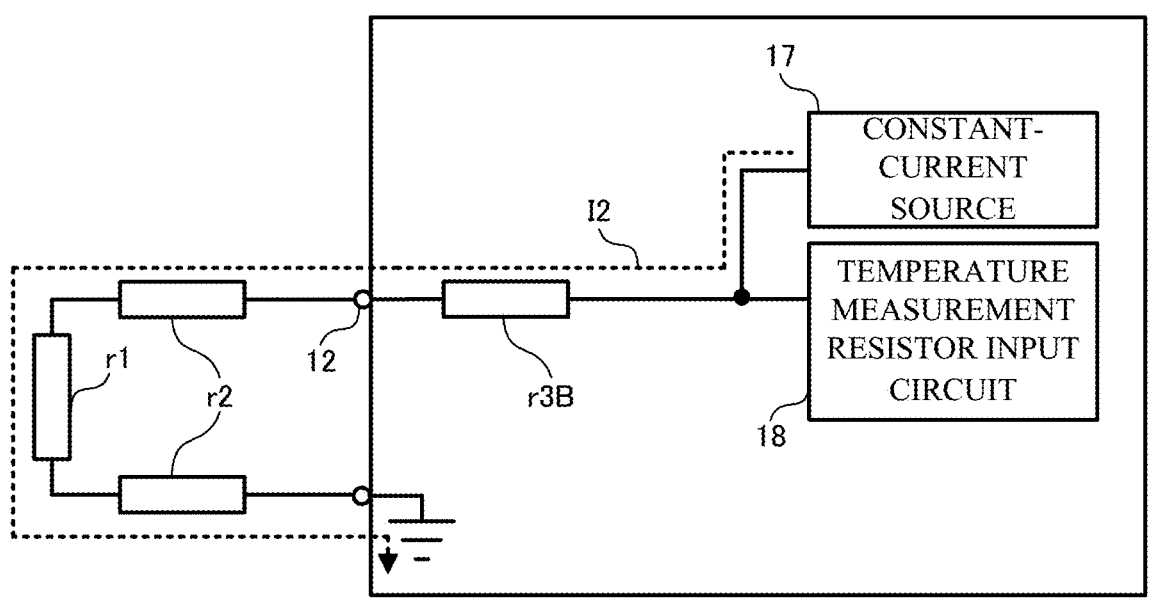
FIG. 3 is a circuit diagram of a temperature measurement resistor input circuit to which the compensating wire is connected in the embodiment, showing an equivalent circuit.

In the embodiment, the controller 20 premeasures the voltage between the two ends of the compensating wire 2 without a disconnection detection current flowing to calculate a correction value from the measured voltage. The controller 20 measures the voltage between the two ends of the compensating wire 2 without a disconnection detection current flowing in the manner described below. Before temperature measurement using the thermocouple 1, the controller 20 switches the terminal switch 13 on to the position B to connect the compensating wire 2 to the temperature measurement resistor input circuit 18. At this time, a direct current fed from the constant-current source 17 flows through the terminal switch 13, the compensating wire 2, the thermocouple 1, and the compensating wire 2 in this order. FIG. 3 shows an equivalent circuit enclosed with a broken line in FIG. 1 in which the terminal switch 13 is switched on to the position B. The resistance value of the compensating wire 2 is denoted with r2, the on-resistance value of the terminal switch 13 switched on to the position B with r3B, and the current value of the direct current fed from the constant-current source 17 with I2. At this time, a voltage V2 input into the temperature measurement resistor input circuit 18 is expressed using the formula (3) below.

$$V2=(r1+2\times r2+r3B)\times I2 \qquad (3)$$

Similarly to the above, without reflecting the resistance of the thermocouple 1, the voltage V2 input into the temperature measurement resistor input circuit 18 is expressed using the formula (4) below.

$$V2 = (2 \times r2 + r3B) \times I2 \quad (4)$$

The on-resistance value r3A for the terminal switch 13 switched on to the position A and the on-resistance value r3B for the terminal switch 13 switched on to the position B differ from each other in channels in the same component alone, and thus are approximate to each other or r3A≈r3B. Hereafter, r3A≈r3B=r3. At this time, the voltage V2 input into the temperature measurement resistor input circuit 18 is expressed using the formula below.

$$V2 = (2 \times r2 + r3) \times I2 \quad (5)$$

The resistance value r2 of the compensating wire 2 and the on-resistance value r3 of the terminal switch 13 are often smaller than or equal to several hundred ohms. In contrast, the disconnection detection resistor 162 often has a resistance of, for example, several mega ohms. The resistance value of the disconnection detection resistor 162 can be higher than the resistance value r2 of the compensating wire 2 and the on-resistance value r3 of the terminal switch 13. Thus, a current fed from the power supply 161 can be regarded as a constant current.

The controller 20 measures the voltage V2 input into the temperature measurement resistor input circuit 18 without a disconnection detection current flowing. The voltage V2 is divided by a current value to calculate the sum of the resistance value r2 of the compensating wire 2 and the on-resistance value r3 of the terminal switch 13. The direct current flowing through the circuit shown in FIG. 3 is I2, whereas the direct current flowing through the circuit shown in FIG. 2 is I1. Thus, the controller 20 multiplies the value acquired by converting the measured value of the voltage V2 into a digital value by I1/I2 to calculate a predicted value of a voltage drop resulting from the wire resistance of the compensating wire 2 and the on-resistance of the terminal switch 13 caused by a disconnection detection current flowing. In temperature measurement using the thermocouple 1, the controller 20 subtracts the predicted value of the voltage drop from the value indicated by the voltage signal output by the thermocouple input circuit 15 to acquire a measured value excluding measurement errors. The predicted value of the voltage drop is referred to as a correction value C1 for correcting the measured value:

$$\text{Correction value } C1 = V2 \times I1 / I2 \quad (6)$$

In temperature measurement using the thermocouple 1, the controller 20 subtracts the correction value C1 from the value indicated by the voltage signal output by the thermocouple input circuit 15 to correct the measured value.

A series of processes performed by the temperature input unit 100 including the above structure for measuring the temperature with the thermocouple 1 will now be described.

For example, a user connects the thermocouple 1 and the compensating wire 2 to the thermocouple input terminal 11, and writes, with a setting tool, a parameter indicating temperature measurement with the thermocouple 1 in the CPU in the PLC. The thermoelectromotive force from the thermocouple 1 with the above characteristics changes with the ambient temperature. Thus, the thermocouple 1 remaining connected causes an error in the correction value C1 and may cause inaccurate calculation of the correction value C1. For this reason, the ends of the compensating wire 2 may thus be short-circuited. The user short-circuits the ends of the compensating wire 2, and then reboots each component of the PLC. After being rebooted, the controller 20 performs a pre-operation (described below) for calculating the correction value, and then performs temperature measurement processing.

Figure 4:
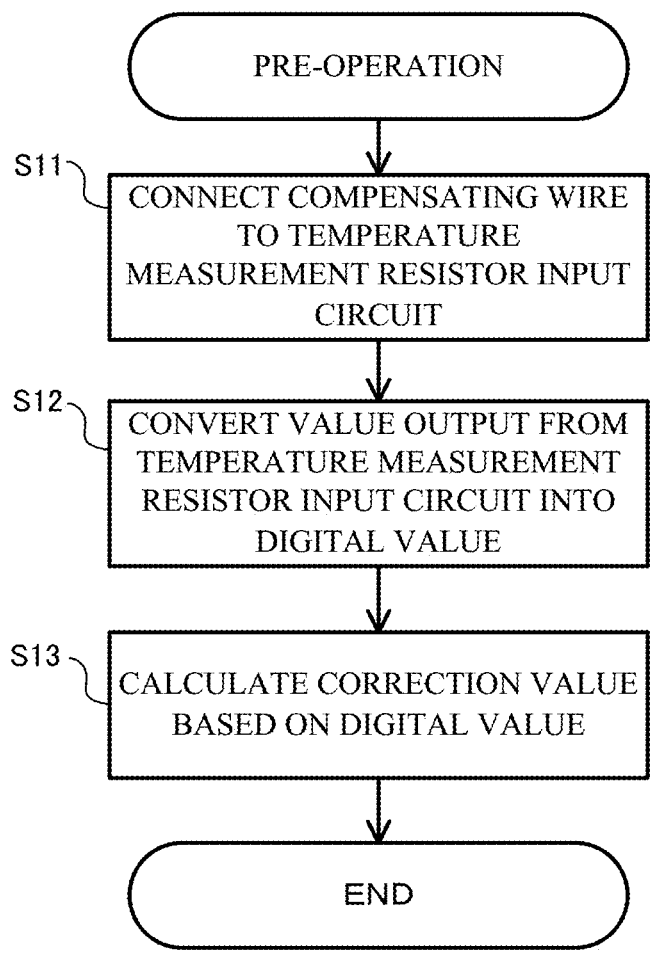
FIG. 4 is a flowchart of a pre-operation performed by the temperature input unit according to the embodiment.

First, a pre-operation performed by the controller 20 before temperature measurement will be described. As shown in FIG. 4, to perform pre-operation, the controller 20 connects the compensating wire 2 to the temperature measurement resistor input circuit 18 (step S11). More specifically, the controller 20 controls the terminal switch 13 to automatically switch the terminal switch 13 to the position B, and controls the input circuit switch 14 to automatically switch the input circuit switch 14 to the position D. Thus, the compensating wire 2, the temperature measurement resistor input circuit 18, and the A/D converter 19 are electrically connected.

As shown in FIG. 3, a direct current flows from the constant-current source 17 through the terminal switch 13 and the compensating wire 2 in this order. As described above, the direct current does not flow through the thermocouple 1 with the ends of the compensating wire 2 being short-circuited. The temperature measurement resistor input circuit 18 amplifies the input voltage signal and outputs the amplified voltage signal to the A/D converter 19. The A/D converter 19 converts an analog value indicated by the input voltage signal into a digital value (step S12). The A/D converter 19 outputs the resulting value to the controller 20. The value output by the A/D converter 19 to the controller 20 is a digital value of the voltage V2 to be input into the temperature measurement resistor input circuit 18.

In accordance with the above formula (6), the controller 20 calculates the correction value C1 by multiplying the digital value provided from the A/D converter 19 by I1/I2 (step S13). The controller 20 stores the calculated correction value C1 in the storage 21. This is the pre-operation. After the pre-operation, the user connects the thermocouple 1 to the compensating wire 2 since the ends of the compensating wire 2 are short-circuited.

Subsequently, the controller 20 starts temperature measurement processing. As shown in FIG. 5, to perform the measurement processing, the controller 20 connects the compensating wire 2 to the thermocouple input circuit 15 (step S21). More specifically, the controller 20 controls the terminal switch 13 to automatically switch the terminal switch 13 to the position A and controls the input circuit switch 14 to automatically switch the input circuit switch 14 to the position C. Thus, the thermocouple 1, the compensating wire 2, the thermocouple input circuit 15, and the A/D converter 19 are electrically connected together.

At this time, a weak direct current fed from the disconnection detection circuit 16 flows through the terminal switch 13, the compensating wire 2, the thermocouple 1, and the compensating wire 2 in this order. The thermocouple input circuit 15 amplifies the input voltage signal and outputs the amplified signal to the A/D converter 19. The A/D converter 19 converts an analog value indicated by the input voltage signal into a digital value (step S22). The A/D converter 19 outputs the resulting value to the controller 20.

The controller 20 subtracts the correction value C1 from the digital value provided from the A/D converter 19 to correct the measured value (step S23). The controller 20 refers to the standard thermoelectromotive force table stored in the storage 21 to acquire the measured value of the temperature corresponding to the corrected measured value (step S24). This is the measurement processing. Steps S11 to S13 and steps S21 to S24 are examples of processes performed by the programs according to an aspect of the present disclosure.

As described above, the temperature input unit 100 according to the embodiment includes the thermocouple input circuit 15 that detects a thermoelectromotive force from the thermocouple 1, and the temperature measurement resistor input circuit 18 that detects a change in the resistance of the temperature measurement resistor. Before measurement using the thermocouple 1, the temperature input unit 100 connects the compensating wire 2 to the temperature measurement resistor input circuit 18 to calculate the sum of the wire resistance of the compensating wire 2 and the on-resistance of the terminal switch 13 without a disconnection detection current flowing. Based on the sum of the wire resistance of the compensating wire 2 and the on-resistance of the terminal switch 13, the temperature input unit 100 calculates a predicted value of a voltage drop caused in response to the thermocouple 1 and the compensating wire 2 receiving a disconnection detection current, and defines the calculated value as a correction value. In temperature measurement, the temperature input unit 100 subtracts a correction value from the measured value to correct the measured value. Thus, before measuring the temperature of a measurement target, the user does not need to raise the temperature of the measurement target to measure the resistance value of the compensating wire 2 and measure the temperature with the thermocouple 1. Accordingly, there is no need to perform complicated preparations by the user before measuring the temperature of a measurement target.

The temperature input unit 100 calculates a correction value with the temperature measurement resistor input circuit 18 provided for the purpose of temperature measurement. Unlike, for example, the structure described in Patent Literature 1, there is no need to add, to the temperature input unit 100, an additional component unused in a typical thermocouple input circuit, and thus there is no need to greatly change the structure of the thermocouple input circuit. Therefore, the temperature input unit 100 with a simple structure can thus correct measurement errors caused by a voltage drop resulting from the wire resistance of the compensating wire 2.

In the embodiment, the storage 21 in the temperature input unit 100 stores programs and data for implementing the above functions, but this is not limitative. A storage in another device connected to the temperature input unit 100 may store the programs and data. Examples of another device include a CPU and another functional unit. The temperature input unit 100 may store the calculated correction values in a storage in another device. A structure including the temperature input unit 100 and the device connected to the temperature input unit 100 corresponds to an example of the temperature measuring device according to an aspect of the present disclosure.

In the embodiment described above, the temperature input unit 100 in the PLC measures the temperature and corrects the measured value, but this is not limitative. For example, a CPU with the above structure may measure the temperature and correct the measured value. In some embodiments, another functional unit with the above structure may measure the temperature and correct the measured value.

In the embodiment described above, a user short-circuits the ends of the compensating wire 2 in the pre-operation before temperature measurement, but the user may not short-circuit the ends of the compensating wire 2. When the ends of the compensating wire 2 are not short-circuited, the correction value C1 includes a slight error due to the thermoelectromotive force from the thermocouple 1. However, as in the embodiment, the temperature input unit 100 can correct measurement errors due to a voltage drop resulting from the wire resistance of the compensating wire 2.

Examples of a non-transitory recording medium that records the above programs include a non-transitory computer-readable recoding medium, such as a universal serial bus (USB) memory, a flexible disc, a compact disc (CD), a digital versatile disc (DVD), a Blu-ray disc (registered trademark), other recording mediums, a magneto-optical disk (MO), a secure digital (SD) card, a memory stick (registered trademark), a magnetic disk, an optical disk, a magneto-optical disk, a semiconductor memory, and a magnetic tape.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

C1 Correction value
V1, V2 Voltage
r1, r2 Resistance value
r3, r3A, r3B On-resistance value
1 Thermocouple
2 Compensating wire
11 Thermocouple input terminal
12 Temperature measurement resistor input terminal
13 Terminal switch
14 Input circuit switch
15 Thermocouple input circuit
16 Disconnection detection circuit
17 Constant-current source
18 Temperature measurement resistor input circuit
19 A/D converter
20 Controller
21 Storage
100 Temperature input unit
161 Power supply
162 Disconnection detection resistor

The invention claimed is:

1. A temperature input circuitry to measure a temperature of a measurement target with at least one of a thermocouple or a temperature measurement resistor, the temperature input circuitry comprising:
   a disconnection detector to feed a disconnection detection current for disconnection detection to the thermocouple and a compensating wire connected to the thermocouple in a case of measurement of the temperature with the thermocouple;
   a thermocouple detection circuit to detect a thermoelectromotive force of the compensating wire and the thermocouple both connected to the temperature input circuitry in the case of measurement of the temperature with the thermocouple;
   a temperature measurement resistor detection circuit to feed a constant current to the temperature measurement resistor, which is connected to the temperature input circuitry, and to detect a resistance of the temperature measurement resistor in a case of measurement of the temperature with the temperature measurement resistor;

a connection switch to connect the compensating wire to the thermocouple detection circuit or the temperature measurement resistor detection circuit; and a measurer to calculate the temperature of the measurement target based on the thermoelectromotive force detected by the thermocouple detection circuit in the case of measurement of the temperature with the thermocouple, and to calculate the temperature of the measurement target based on the resistance of the temperature measurement resistor detected by the temperature measurement resistor detection circuit in the case of measurement of the temperature with the temperature measurement resistor, wherein the measurer controls, before measuring the temperature of the measurement target with the thermocouple, the connection switch to connect the compensating wire to the temperature measurement resistor detection circuit, and calculates a predicted value of a voltage drop resulting from a resistance of the compensating wire occurring in response to the disconnection detection current, and controls the connection switch to connect the compensating wire to the thermocouple detection circuit, and subtracts the predicted value from a measured value of the thermoelectromotive force detected by the thermocouple detection circuit to calculate a corrected measured value of the thermoelectromotive force detected by the thermocouple detection circuit and based on which the measurer calculates the temperature of the measurement target.

2. The temperature input circuitry according to claim 1, wherein the measurer calculates the measured value while the thermocouple is connected to the compensating wire.

3. The temperature input circuitry according to claim 1, wherein the measurer calculates a resistance value of the compensating wire with the temperature measurement resistor detection circuit, and calculates the predicted value based on the resistance value and a current value of the disconnection detection current.

4. The temperature input circuitry according to claim 3, wherein the measurer calculates the measured value while the thermocouple is connected to the compensating wire.

5. A temperature measuring device to measure a temperature of a measurement target with at least one of a thermocouple or a temperature measurement resistor, the temperature measuring device comprising:

a disconnection detector to feed a disconnection detection current for disconnection detection to the thermocouple and a compensating wire connected to the thermocouple in a case of measurement of the temperature with the thermocouple;

a thermocouple detection circuit to detect a thermoelectromotive force of the compensating wire and the thermocouple both connected to the temperature measuring device in the case of measurement of the temperature with the thermocouple;

a temperature measurement resistor detection circuit to feed a constant current to the temperature measurement resistor, which is connected to the temperature measuring device, and to detect a resistance of the temperature measurement resistor in a case of measurement of the temperature with the temperature measurement resistor;

a connection switch to connect the compensating wire to the thermocouple detection circuit or the temperature measurement resistor detection circuit; and a measurer to calculate the temperature of the measurement target based on the thermoelectromotive force detected by the thermocouple detection circuit in the case of measurement of the temperature with the thermocouple, and to calculate the temperature of the measurement target based on the resistance of the temperature measurement resistor detected by the temperature measurement resistor detection circuit in the case of measurement of the temperature with the temperature measurement resistor, wherein the measurer controls, before measuring the temperature of the measurement target with the thermocouple, the connection switch to connect the compensating wire to the temperature measurement resistor detection circuit, and calculates a predicted value of a voltage drop resulting from a resistance of the compensating wire occurring in response to the disconnection detection current, and controls the connection switch to connect the compensating wire to the thermocouple detection circuit, and subtracts the predicted value from a measured value of the thermoelectromotive force detected by the thermocouple detection circuit to calculate a corrected measured value of the thermoelectromotive force detected by the thermocouple detection circuit and based on which the measurer calculates the temperature of the measurement target.

6. The temperature measuring device according to claim 5, wherein the measurer calculates the measured value while the thermocouple is connected to the compensating wire.

7. The temperature measuring device according to claim 5, wherein the measurer calculates a resistance value of the compensating wire with the temperature measurement resistor detection circuit, and calculates the predicted value based on the resistance value and a current value of the disconnection detection current.

8. The temperature measuring device according to claim 7, wherein the measurer calculates the measured value while the thermocouple is connected to the compensating wire.

9. A non-transitory computer readable recording medium storing a program executable by a temperature measuring device that measures a temperature of a measurement target with at least one of a thermocouple or a temperature measurement resistor, the temperature measuring device including:

a disconnection detector to feed a disconnection detection current for disconnection detection to the thermocouple and a compensating wire connected to the thermocouple in a case of measurement of the temperature with the thermocouple, a thermocouple detection circuit to detect a thermoelectromotive force of the compensating wire and the thermocouple both connected to the temperature measuring device in the case of measurement of the temperature with the thermocouple, a temperature measurement resistor detection circuit to feed a constant current to the temperature measurement resistor, which is connected to the temperature measuring device, and to detect a resistance of the temperature measurement resistor in a case of measurement of the temperature with the temperature measurement resistor, a connection switch to connect the compensating wire to the thermocouple detection circuit or the temperature measurement resistor detection circuit, and a measurer to calculate the temperature of the measurement target based on the thermoelectromotive force detected by the thermocouple detection circuit in the case of measurement of the temperature with the thermocouple, and to calculate the temperature of the measurement target based on the resistance of the temperature measurement resistor detected by the temperature measurement resistor detection circuit in the case of measurement of the temperature with the temperature measurement resistor, the program causing the temperature measuring device to perform operations comprising:

controlling, before measuring the temperature of the measurement target with the thermocouple, the connection switch to connect the compensating wire to the temperature measurement resistor detection circuit;

calculating a predicted value of a voltage drop resulting from a resistance of the compensating wire occurring in response to the disconnection detection current;

controlling the connection switch to connect the compensating wire to the thermocouple detection circuit; and subtracting the predicted value from a measured value of the thermoelectromotive force detected by the thermocouple detection circuit to calculate a corrected measured value of the thermoelectromotive force detected by the thermocouple detection circuit and based on which the measurer calculates the temperature of the measurement target.

10. The recording medium according to claim 9, wherein the program causes the measurer to calculate the measured value while the thermocouple is connected to the compensating wire.

11. The recording medium according to claim 9, wherein the program causes the measurer to calculate a resistance value of the compensating wire with the temperature measurement resistor detection circuit, and to calculate the predicted value based on the resistance value and a current value of the disconnection detection current.

12. The recording medium according to claim 11, wherein the program causes the measurer to calculate the measured value while the thermocouple is connected to the compensating wire.

* * * * *